Dec. 9, 1952     C. BREER     2,620,678
POWER TRANSMISSION
Filed Feb. 27, 1948     6 Sheets-Sheet 1
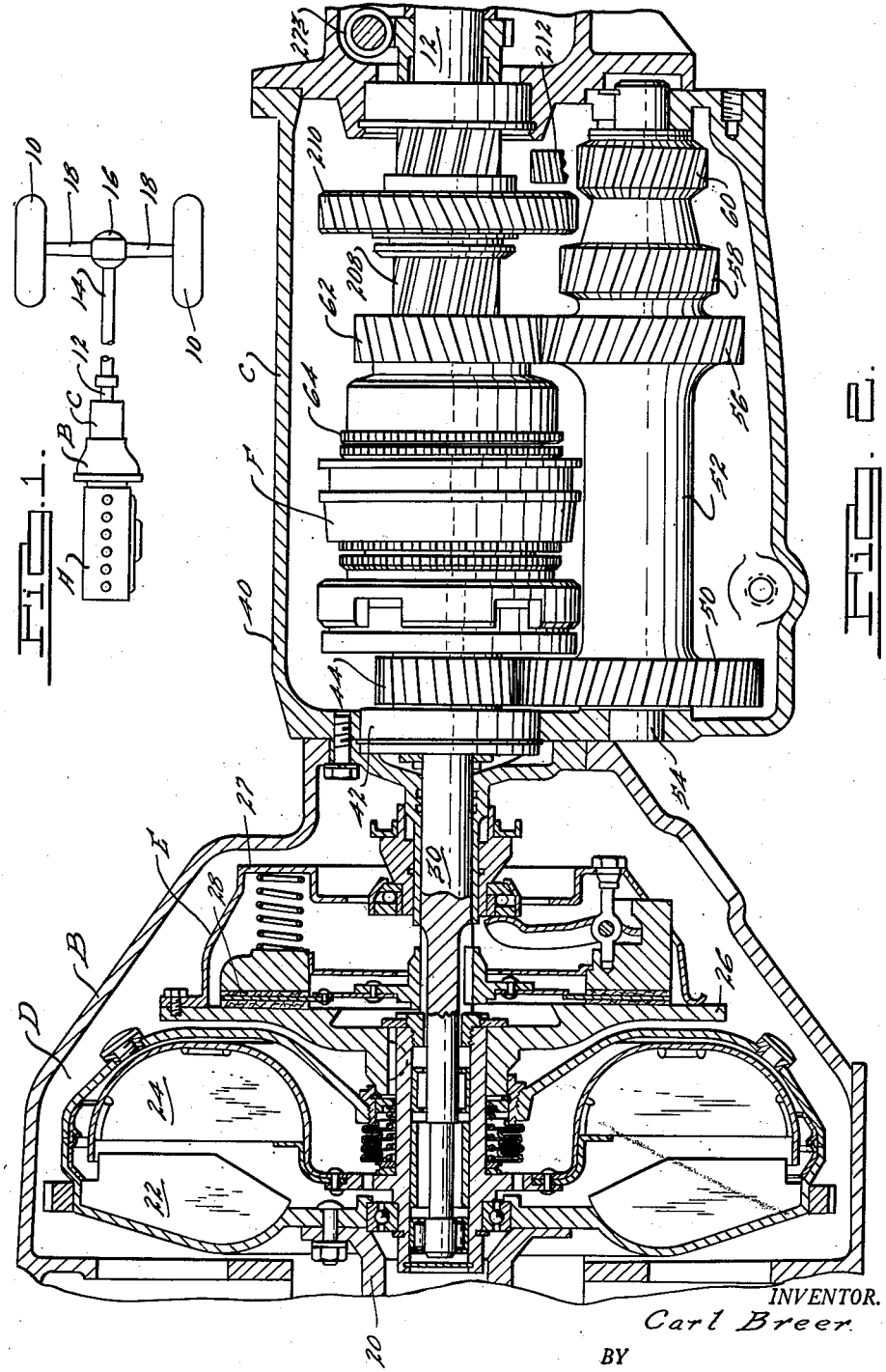
INVENTOR.
Carl Breer.
BY
Harness and Harris
ATTORNEYS

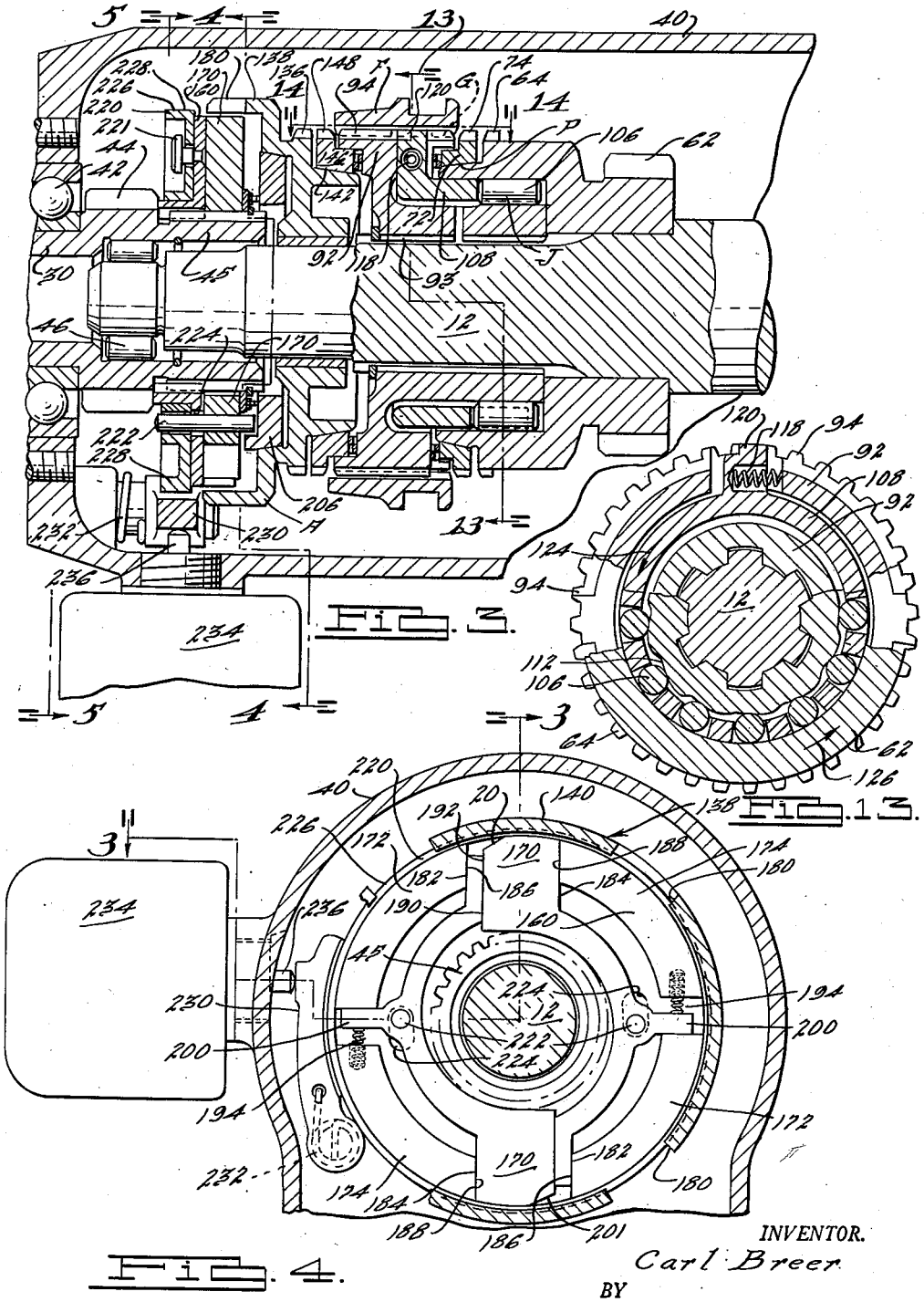

Dec. 9, 1952  C. BREER  2,620,678
POWER TRANSMISSION
Filed Feb. 27, 1948  6 Sheets-Sheet 3

INVENTOR.
Carl Breer
BY
Harness and Harris
ATTORNEYS.

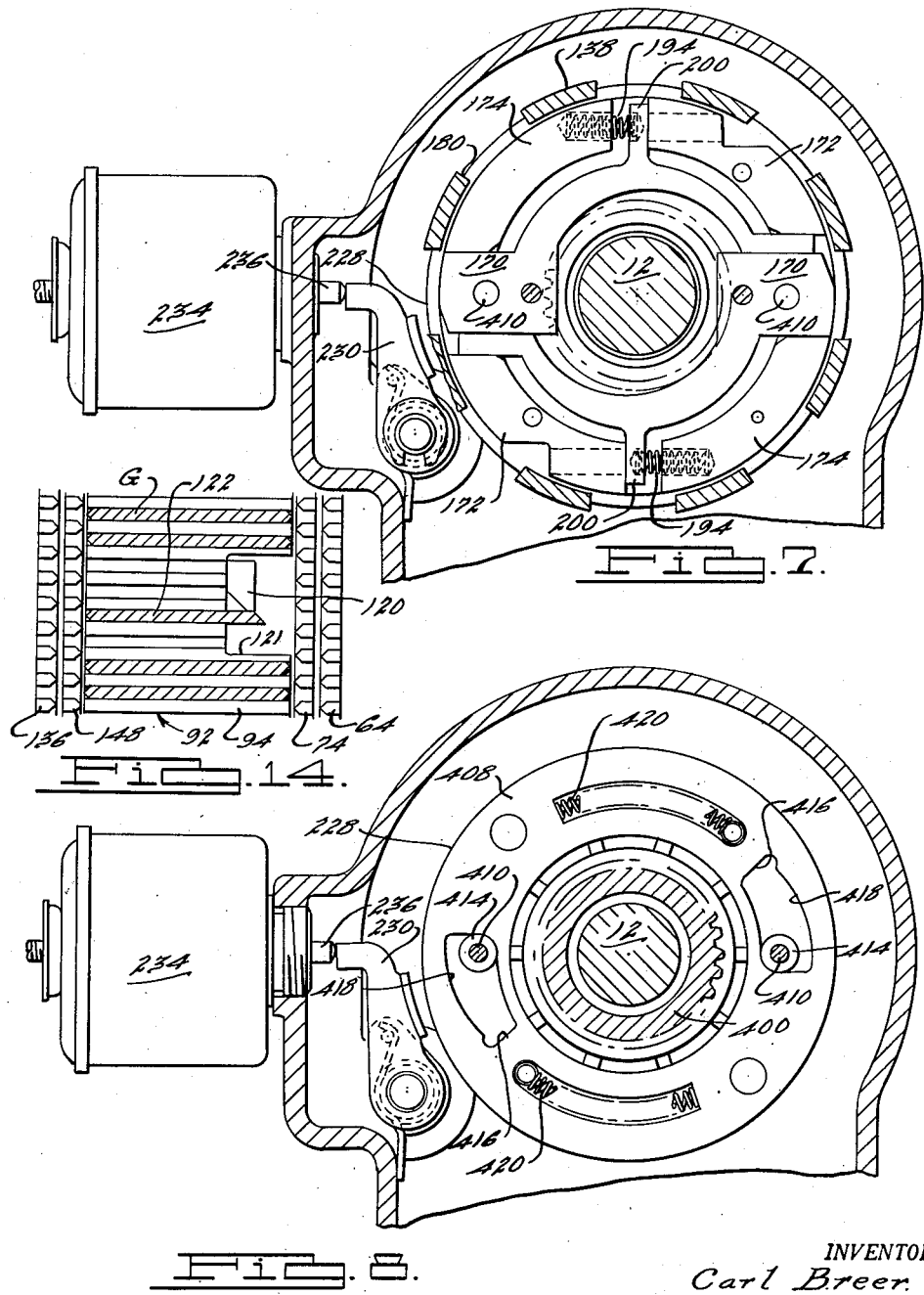

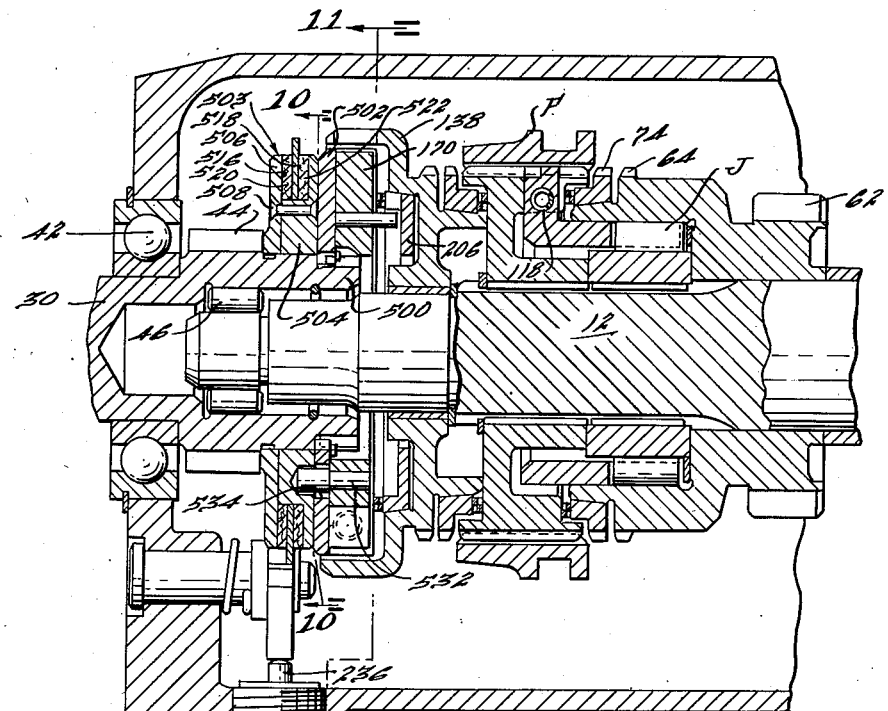
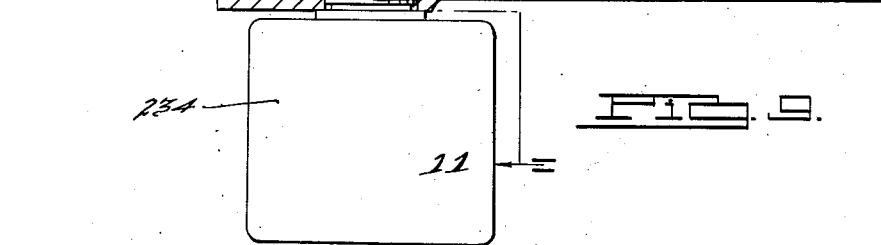
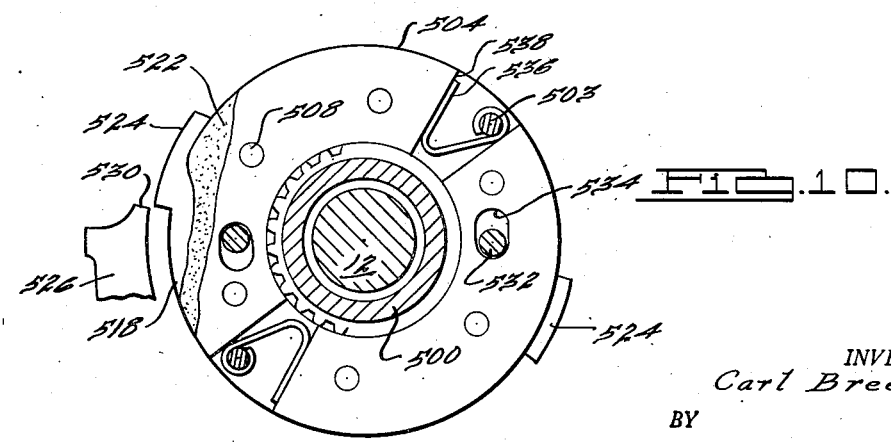

Dec. 9, 1952          C. BREER          2,620,678
POWER TRANSMISSION

Filed Feb. 27, 1948          6 Sheets-Sheet 6

INVENTOR.
Carl Breer
BY
Harness and Harris
ATTORNEYS.

Patented Dec. 9, 1952

2,620,678

UNITED STATES PATENT OFFICE 2,620,678

POWER TRANSMISSION

Carl Breer, Grosse Pointe, Mich., assignor to Chrysler Corporation, Highland Park, Mich., a corporation of Delaware Application February 27, 1948, Serial No. 11,662

23 Claims. (Cl. 74—336)

This invention relates to power transmissions, particularly to improvements in semi-automatic transmissions of the character disclosed, for example, in the copending application of Robert W. Wolfe, Serial No. 780,011 filed October 15, 1947, providing three-speed forward and reverse drives wherein a centrifugal type pawl clutch is employed to provide a change from a slower to a faster speed ratio drive on engine deceleration at or above a predetermined vehicle speed in the slower drive, and wherein the transmission receives its drive from the engine through a fluid power-transmitting device.

It is a principal object of the invention to provide improved apparatus to provide a change from a faster to a slower speed ratio drive.

It is an additional object of the invention to provide means to retract the pawl type clutch forcibly and utilize dynamic forces existing as an incident to operation of the transmission to effect the pawl retraction.

It is a further object of the invention to provide means to induce relative rotation between an actuator plate and a pawl retainer and to utilize this relative rotation to move the pawls of the pawl type clutch radially inward.

It is an additional object of the invention to provide means to induce the above relative rotation between the actuator plate and pawl retainer by friction and to provide alternative means to induce the relative rotation by positive lever action.

These and other objects of my invention will become apparent from the following description when taken in conjunction with the accompanying drawings in which:

Fig. 1 is a diagrammatic showing of the power plant drive mechanism of a vehicle incorporating the present invention.

Fig. 2 is an enlarged cross sectional view of a portion of the mechanism of Fig. 1 including the change speed transmission of my invention.

Fig. 3 is a detailed enlarged sectional view of the second-direct clutch mechanism of Fig. 2, taken on the line 3—3 of Fig. 4 with the shiftable clutch sleeve being shown in neutral position and the centrifugal clutch pawls being shown disengaged.

Fig. 4 is a sectional view taken on the line 4—4 of Fig. 3 showing the centrifugal pawl clutch mechanism with the pawls disengaged from the pawl shell;

Fig. 7 is a sectional view taken on the line 7—7 of Fig. 6.

Fig. 8 is a sectional view taken on the line 8—8 of Fig. 6.

Fig. 9 is a detailed enlarged view of a second-direct clutch mechanism similar to Figures 3 and 6, but incorporating a modified form of the invention.

Fig. 10 is a sectional view taken on the line 10—10 of Fig. 9.

Fig. 13 is a section taken substantially on the line 13—13 of Fig. 3.

Fig. 14 is a sectional development of some of the interengageable teeth of the Fig. 3 clutch taken on line 14—14 of Fig. 3, the clutch sleeve being shown in neutral position.

Figure 5:
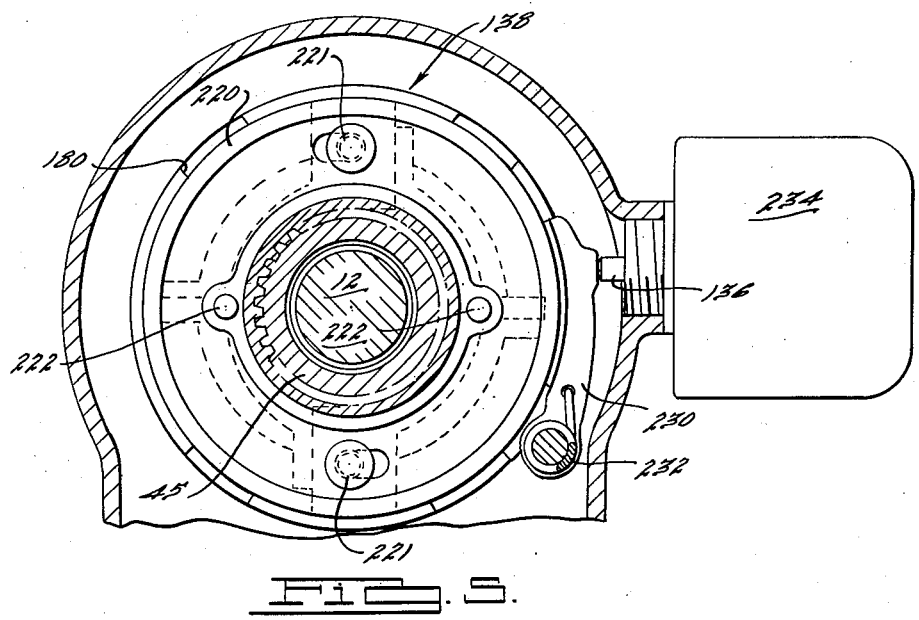
Fig. 5 is a sectional view taken on the line 5—5 of Fig. 3.

Referring now to the drawings wherein similar reference characters are used to designate corresponding parts of the structure, Fig. 1 illustrates a typical arrangement of the transmission mechanism of the present invention in a vehicle embodying the same. The vehicle engine A is coupled to the driving wheels 10 of the vehicle through a fluid power-transmitting and main clutch unit B and a change speed gearing C shown in more detail in Fig. 2 and comprising a three-speed forward and reverse transmission having under driver control an automatically operative direct drive ratio. As seen in Fig. 1, the output shaft 12 of the unit C is connected by means of the usual propeller shaft 14 with customary differential gear box 16 which in turn drives the axle shafts 18.

As best seen in Fig. 2, I preferably arrange for transmitting drive from the engine A to the transmission C through clutch means comprising a fluid power-transmitting device such as the fluid coupling D preferably in conjunction with a releasable main clutch E of conventional design to facilitate manual shifts of the clutch sleeve F in the transmission C.

The engine crankshaft 20 (Fig. 2) drives the coupling impeller 22 to circulate fluid in its vaned passages to drive the vaned runner 24 in a manner well known for fluid couplings of the type illustrated. The runner 24 drives the input member or driving plate 26 of the main clutch E which, as illustrated, is of the friction type. As shown, the driving plate 26 is drivingly connected with the runner 24 and to a clutch housing member 27. The driven member or mat 28 of the friction clutch E is fixed to the intermediate shaft 30.

The shaft 30 extends rearwardly into the housing or casing 40 of the transmission C (Fig. 2) where it is rotatably supported by a bearing 42 and is formed with a main drive pinion 44 at its inner end. Also formed on the inner end of the shaft 30 is a portion 45 constituting the core of a centrifugal clutch, more clearly illustrated in Fig. 3. The drive pinion 44 is hollow and journals by a bearing 46 (Fig. 3) the forward end of the transmission driven shaft 12.

The drive pinion 44 is in constant mesh with a gear 50 for driving the countershaft cluster 52 carried for rotation on a countershaft 54 supported in the casing 40. The cluster 52 includes a second or intermediate speed pinion 56, a first or low speed pinion 58, and a reverse drive pinion 60.

The second speed pinion constantly meshes with a second speed gear 62 journaled for rotation on the shaft 12, as seen in Fig. 3. This gear has a set of integral external clutch teeth 64 adapted for interengagement with a group of internal clutch teeth generally designated by the letter "G" in Fig. 3 of a manually shiftable clutch member F which is adapted to be shifted axially of the shaft 12 to various positions by a shift yoke and rail mechanism, not shown, under control of the vehicle driver with suitable stops or detents being provided to properly locate the sleeve in any given position. The clutch sleeve F is slidably carried on a toothed hub member 92 splined to the shaft 12 at 93.

Engagement with the teeth 64 is effected by rearward movement of the sleeve from its neutral position in Figs. 2 and 3 to a two way second speed position of the sleeve which establishes a drive through the elements 30, 44, 50, 56, 62, F, 92, 12.

The gear member 62 is also provided with a cone-shaped surface P on which is rotatably carried a blocker and synchronizing element or ring 72, having clutch blocker synchronizing teeth 74 which are engageable by the teeth G of the clutch sleeve F, for blocking rearward shift of the clutch sleeve when the relative rotative speeds of the sleeve and gear 62 are asynchronous.

The clutch sleeve F is slidably carried on the toothed hub member 92 which is splined to the shaft 12 at 93. The hub 92 has external splines or teeth 94 being spaced circumferentially to receive the internal teeth generally designated by the letter G of the shift sleeve.

An overrunning clutch generally designated by the letter J (Fig. 3) is arranged drivingly intermediate to the gear member 62 and clutch sleeve F carried by the hub 92 and adapted to selectively drivingly be connected to the sleeve F to provide a one-way driving connection between the gear 62 and hub 92 through the clutch sleeve F, the clutch J being adapted to drivingly lock the gear 62 and sleeve F together upon tendency of the gear 62 to rotate faster than the sleeve F in a forward direction, that is, clockwise looking rearwardly of Fig. 3, while permitting overrun of the clutch sleeve F relative to the gear 62 upon tendency of the clutch sleeve F to rotate faster than the gear 62.

The clutch J is of the conventional roller type and is provided with rollers 106 (Fig. 13) and a cage or carrier 108 having a resilient driving connection with the hub 92. The forward portion of the gear 62 forms the outer race of the device J. The rearwardly extending portion of hub 92 is provided with cam surfaces 112 and forms the inner race. A compression spring 118 has one end seated against a lug 120 of cage 108 which is positioned in a slot 121 in hub 92. The other end of spring 118 is seated against hub 92. The spring 118 biases the rollers in the direction of the arrow 124 in Fig. 13, into lockup position such that lockup occurs whenever the gear 62 tends to rotate forwardly in the direction of the arrow 126 in Fig. 13, faster than the hub 92.

The slot 121 in hub 92 permits lug 120 to have a limited clocking movement therein which accommodates movement of the cage 108 of the freewheeling device J. The spring 118 urges the cage into lockup position which is equivalent to moving the lug 120 to the lower portion of slot 121 in Fig. 14. Certain of the teeth G designated by the numeral 122 are shortened as illustrated in Fig. 14. The lug 120 is provided with a cam surface 123 adapted to cooperate with a tooth 122. When the sleeve F is moved to the left in Figs. 3 and 14 the lug 120 and cage 108 are free to move relative to slot 121 and the races of the freewheeling unit to lock the latter up when the speed of gear 62 exceeds the speed of hub 92. However, when sleeve F is moved to its neutral position as shown in Fig. 3 the tooth 122 cams the lug 120 to the upper portion of slot 121 thereby clocking cage 108 to a position which renders a drive through overrunning clutch J impossible. When sleeve F is moved even more to the right to clutch with teeth 64 of gear 62 the lug 120 is retained in this upper position which prevents a drive from being established through clutch J.

In the forward movement of the clutch sleeve F to establish freewheel second ratio drive, the internal teeth G of the clutch sleeve are engaged with a set of clutch teeth 136 of a floating pawl engaging shell or cage 138 which is journalled on the shaft 12 this shell having a rearwardly extending hub portion 140 provided with an external conical friction face 142. A blocker synchronizer ring 146 is rotatably supported on the conical face 142 of the shell 138 and has blocker teeth 148 which are similar in form to the blocker teeth 74 of the ring 72.

The drive pinion 44 has a member 160 keyed thereto which serves as the carrier for the pawls 170 of a centrifugal clutch of which the shell 138 is the driven portion. As seen in Fig. 4 the member 160 is provided with pawl guides 172 and 174. Slidably mounted between portions 172, 174 are a pair of radially movable pawls 170 which are adapted for outward movement oppositely to one another to engage slots or windows 180 provided in the floating shell 138 to establish a two-way direct drive between the shafts 12 and 30 when the teeth G of the clutch sleeve F are engaged with the clutch teeth 136 of the shell. Preferably, a plurality of pawl-receiving windows are provided. The number of windows is also preferably a multiple of the number of pawls and in the present construction, four pawl-receiving windows having a 90 degree circumferential spacing are shown. Each of the pawls has faces 182, 184 on the tail and head portions thereof respectively in sliding engagement with faces 186, 188 respectively, of the portions 172, 174 respectively of the pawl carrier (see Fig. 4). The pawls 170 are oppositely disposed relative to one another so that the face 190 of the head portion of the pawl opposite to the face 184 thereof slidably engages the face 192 of the tail portion opposite the face 182 of the latter.

In order to keep the pawls disengaged as in Fig. 4, below a predetermined speed of rotation of the pawl carrier 45, a normal radially inwardly acting bias is applied to the pawls to oppose their centrifugal tendencies in the speed range in which disengagement is desired. For this purpose control or governor means comprising compression springs 194 are provided in the carrier portions 174 and engaged lateral wing portions 200 of the pawls 170, to urge the pawls inwardly. Adjustment of the engaging speed of the pawls may be made either by replacing the springs with new ones of different force values or by means of adjustment screws (not shown).

The pawl windows 180 are preferably arranged such that diametrically opposite windows will simultaneously register with the pawls 170 so as to receive the pawls under the conditions hereinafter described.

The pawls 170 are slightly rounded or ramped at their outer leading portions 201 to reduce any slight ratcheting during any relative rotation of the member 160 and the shell 138 when the pawls are free to engage. Outward pawl movement following engagement is limited by engagement of the wing portion 200 thereof with pawl carrier portion 174.

Suitable means preferably in the nature of a blocker or balk ring 206 is provided for preventing or blocking engagement of the pawls during rotation above their engaging speeds under drive or coast torque operating conditions when the relative speeds of the pawl shell 138 and the pawl carrier member 160 are asynchoronous. Reference may be had to the copending application Serial No. 780,011 for a more complete description and showing thereof.

Rearwardly of the gear 62 the shaft 12 is provided with a spiral splined portion 208 on which is slidable a low-reverse gear 210, this member being shown in its neutral position in Fig. 2. The gear 210 may be shifted forwardly or rearwardly of its neutral position by conventional yoke and rail mechanism (not shown) under driver control. When shifted forwardly, the gear becomes engaged with the low speed gear 58 to establish the low or first speed ratio drive between the shafts 30 and 12, the drive consisting of the elements 30, 44, 50, 210, 12. When shifted rearwardly, the gear 210 becomes engaged with an idler gear 212 that is constantly in mesh with the reverse gear 60 thus establishing reverse drive between the shafts 30 and 12 through the elements 44, 50, 60, 212, 210. It will be understood that when shifting the gear 210 the clutch sleeve F will be locked in neutral position.

In the operation of the transmission thus far described let it be assumed that the clutch sleeve F and the low reverse gear 210 are both in neutral position, the main or friction clutch E is engaged and the engine is idling at approximately 450 R. P. M. Under these conditions the impeller 22 of the fluid coupling D will rotate at engine speed. There will be very little slip in the coupling at this time due to the light load imposed on the coupling by the freewheel clutch J, pawl carrier 160, and countershaft parts. Therefore, the pawl carrier and pawls will rotate at a speed slightly under engine speed but not sufficiently high to effect centrifugal movement of the pawls against the bias of the control springs 194.

In order to obtain forward movement of the vehicle, the driver will release the main clutch E so as to permit shifting into one of the two second speed starting gear ratios or into low or reverse gear. If the driver desires to start in the automatic upshifting second speed gear he will shift the clutch sleeve F forwardly during which movement the clutch sleeve teeth G will become engaged with the teeth 136 of the pawl shell 138. Since the pawl shell 138 is floating at this time, no difficulty will be encountered in engaging the teeth 136 of this member with the teeth of the clutch sleeve F. Upon completion of the forward movement of the clutch sleeve F, the driver will reengage the main clutch E and depress the accelerator pedal 238 to speed up the engine whereupon the vehicle will be driven forwardly in freewheel second speed ratio drive referred to above, through the gear train comprising the shaft 30, pinion 44, gear 50, pinion 56, gear 62, freewheel device J, sleeve F, hub 92, and shaft 12. This is the starting or breakaway drive ratio.

The vehicle may now be accelerated in freewheel second speed ratio drive, the various elements including the pawl carrier member 160 being speeded up as the engine speed is increased by further throttle opening movement of the accelerator.

Manifestly, the pawl carrier member 160 will rotate at a speed corresponding to that of the runner and at some predetermined speed of these elements, for example, 650 to 750 R. P. M. substantially corresponding to a car speed in direct drive between 13.5 to 16 M. P. H. the pawls will overcome the biasing effect of the control springs 194 and will try to move radially outwardly under centrifugal force in an effort to engage the pawl shell 138. However, at this time the pawl shell which is being driven by the gear 62 through the clutch sleeve F is rotating at a slower speed than the drive pinion 44 and pawl carrier 45. When the driver wishes direct speed ratio drive to be established he merely releases the accelerator pedal which in turn closes the throttle to decelerate the engine, whereupon the runner 24 and the pawl carrier member 160 will slow down relative to the pawl shell. When the rotative speeds of the carrier member and shell become synchronized and cross each other and the pawls are aligned with the windows on the pawl shell nearest thereto engagement of the pawls will take place.

Upon depression of the accelerator pedal to again speed up the engine, the transmission of torque will be resumed and direct drive will be established in the transmission, this comprising drive from the shaft 30 through pawl carrier member 160, pawls 170, shell 138, clutch sleeve F, hub 92, and shaft 12. This is a two-way drive. It will be understood that engagement of the pawls will be cushioned by the fluid coupling and clutch which will absorb any shock occurring upon making this engagement and minimize any vibration and noise.

With the clutch sleeve F engaged with the clutch teeth 136 in direct drive, the inner race of the freewheel device J will rotate at the speed of the drive pinion 44 which is higher than the speed of the second speed gear 62 and hence will overrun the gear 62.

The pawl clutch will remain engaged and the vehicle will be driven in direct drive until the speed of the pawl carrier 45 falls below a predetermined speed of rotation, for instance, between 500 to 625 R. P. M., for example, corresponding to a car speed of between 10.5 to 12.75 M. P. H. in direct drive whereupon the springs 194 may effect a release of the pawls 170 and hence a release of the direct drive so that second speed ratio drive through the freewheel device J will be resumed automatically In view of this automatic operation, it is possible, for example, for the driver to slow down the vehicle in approaching a stop and downshift from direct drive to freewheel second drive ratio in the process, all without releasing the main clutch E. While standing at a traffic signal, the driver may maintain the transmission in freewheel second drive ratio without substantial creep of the vehicle occurring, the engine idle speed for such operation being insufficient to develop enough torque to overcome the drag load of the vehicle on the runner of the fluid coupling. When the traffic signal changes, the driver need merely depress the accelerator pedal to accelerate the engine and the vehicle will again move forward in freewheel second drive ratio and direct drive may be re-established, as described above, upon release of the accelerator pedal to permit the engine to coast and allow the pawls to unblock and engage.

It is sometimes desirable, for instance, when coasting down a hill in direct drive or freewheel second drive ratio, to obtain engine braking in second speed ratio. With the present transmission this is accomplished by releasing the main clutch E and shifting the clutch sleeve F rearwardly through the neutral position to engage the teeth G of the clutch sleeve with the teeth 64 of the second speed gear 62 to establish two-way second speed ratio drive comprising the shaft 30, pinion 44, gear 50, pinion 56, gear 62, clutch sleeve F, hub 92 and shaft 12. During a shift from neutral to two-way second drive and rearward manipulation of the shift sleeve following release of the main clutch E the blocker ring 72 through its friction engagement at the cone P with the second speed gear 62 will rotatably lead the clutch sleeve such that the teeth G of the clutch sleeve will abut the blocker teeth 74 of the blocker ring until the speed of the sleeve and second speed gear 62 are synchronized whereupon engagement may be made.

Shifts from neutral into low (first speed) or reverse by means of the shiftable gear 210 have already been described, and it is to be noted that in these drives the pawls are generally blocked but if they should engage no damage would result since the shell 136 is then a loose piece. If now it is desired to shift from low to two-way second speed, the main clutch E will be released, the manual selector will be moved through the neutral position to restore the sliding gear 210 to neutral position and clutch sleeve F will then be shifted rearwardly to engage the clutch teeth 64. Since the drive is from a lower to a higher gear, it will be necessary to slow down the second speed gear 62 to the speed of the shaft 12, or stated otherwise, it will be necessary to synchronize the rotative speeds of the shaft 12 and the gear 62. As the sleeve F is shifted rearwardly, the teeth G of the clutch sleeve F will abut the teeth 74 of the synchronizing ring 72, the clutch sleeve at the time of the shift rotatably lagging the teeth of the synchronizing ring. Continued pressure applied rearwardly by the shift sleeve F will increase the synchronizing pressure at the friction cone P and cause the gear 62 to be slowed down to the speed of the shaft 12. When the parts are synchronized the teeth G of the sleeve will enter between clutch teeth 64 of the second speed gear thus establishing two-way second speed ratio drive.

My invention provides apparatus adapted to be superimposed on the transmission thus far described to provide a change from a faster to a slower speed ratio drive. Figures 3, 4 and 5 illustrate one form of such apparatus. The apparatus disengages the pawls 170 from the windows 180 of the shell 138 against the action of centrifugal force as an incident to a normal downshift due to decrease in vehicle speed or as an incident to a forced kickdown in speed ratio drive while the vehicle is being operated above the predetermined governor speed. The disengagement of the pawls is effected by producing relative rotation between an actuator plate and the pawl carrier member 160. An actuator plate 220 is carried by the pawl carrier member 160 by rivets 221 which pass through elongated openings in the actuator plate. A pair of pins 222 are secured to the actuator plate 220 and project through elongated slots 224 in the pawl carrier member 160. Each pin 222 is secured to one of the pawls 170. The peripheral edge 226 of the actuator plate 220 is provided with a braking surface 228. A brake shoe 230 is pivotally mounted at 232 in the transmission housing 40 and urged to rotate in a counterclockwise direction in Fig. 4 away from the braking surface 228 by a spring 232. A solenoid 234 is carried by the housing 40 and adapted when energized to have a plunger portion 236 thereof engage brake shoe 230 to force the latter into contact with surface 228 to slow down the rotation of actuator plate 220. This moves pins 222 in slots 224 which in turn move the pawls relative to the pawl carrier 160. Movement of the pawls relative to the pawl carrier member 160 can only be accommodated by radial movement of the pawls in view of the fact that they are guided by portions 172 and 174 of the pawl carrier member 160. The pawls are thus withdrawn radially out of the windows 180 in shell 138 as an incident to the application of the brake shoe 230 by energization of the solenoid 234. Thus a change from a faster to a slower speed ratio drive is effected as an incident to energization of solenoid 234. Slots 224 in the pawl carrier accommodate outward movement of the pawls 170 and pins 222 under the influence of centrifugal force.

Figure 12:
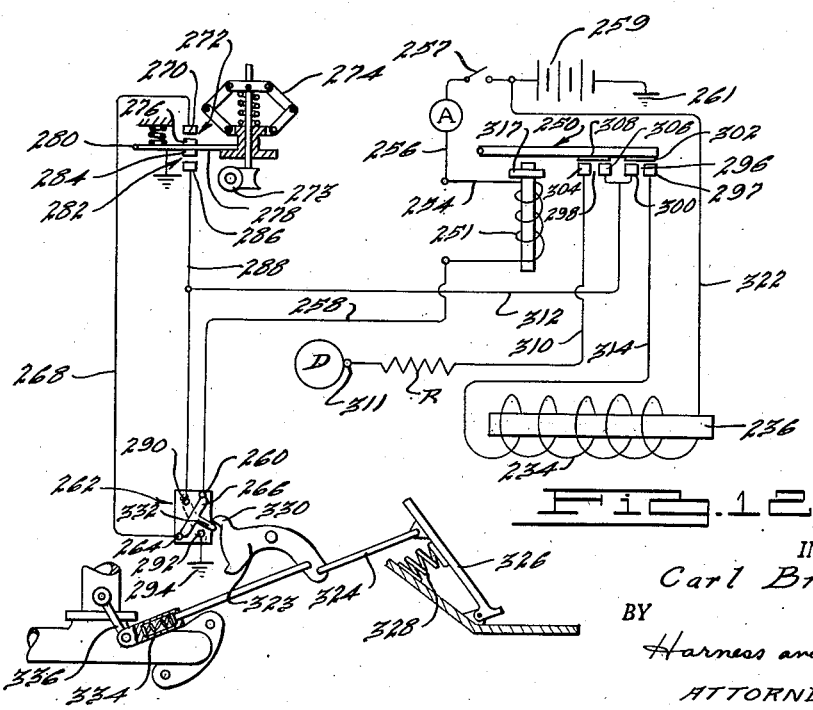
Fig. 12 is a schematic view of a control system for initiating a change in speed ratio drive.

In Fig. 12 a control circuit is illustrated which is capable of providing the vehicle driver with control as to the time of energization of solenoid 234. The apparatus to be described for controlling the energization of solenoid 234 is also adapted to simultaneously relieve the torque on the pawls by interrupting the engine ignition system. Although the apparatus described herein for controlling the energization of solenoid 234 includes means for interrupting the engine ignition system it may be possible under certain circumstances which permit the application of sufficient force to retract the pawls from the shell without relieving the torque to dispense with the ignition interruption means.

The control circuit illustrated in Fig. 12 does not form a part of my invention but is the invention of one Louis B. Forman as shown in his application Serial No. 789,159.

As seen in Fig. 12 the numeral 250 designates a measured time delay relay, the winding 251 of which is connected by conductors 254 and 256 in series with an ammeter A and ignition switch 257 to a source of electric power such as a battery 259, the negative terminal of which is grounded at 261. The other side of the coil is connected by a conductor 258 with a terminal 260 of a double pole two position snap switch 262. A second terminal 264 which may be bridged into electrical circuit with the contact terminal 260 by a contact bar 266 of the switch 262 is connected by a conductor 268 with the contact 270 of the high speed switch 272 of a suitable governor 274 driven by worm gear 273 associated with shaft 12 (Fig. 2). The switch 272 has a second contact 276 carried by a grounded arm 278 thereof fulcrumed at 280 with which it may contact at or above a predetermined vehicle speed at which the pawls of the clutch are adapted to be engaged.

The governor has a low speed switch 282 comprising a contact 284 carried by the switch arm 278 and a second contact 286 which is connected by a conductor 288 to a contact terminal 290 of the kickdown switch mechanism 262. Diagonally opposite the contact 290 is a contact terminal 292 which is grounded as at 294. The contacts 290 and 292 may be bridged by the bar 266 to bring ground 294 to the low speed governor switch when the switch 262 is in its kickdown position indicated by the dotted line position of the bar 266. When the relay coil 251 is energized two switches are closed. These switches are numbered 296 and 298. Switch 296 comprises terminals 297 and 300 which are bridged by bar 302. Switch 298 comprises terminals 304 and 306 which are bridged by bar 308. Terminal 304 connects by a conductor 310 with a resistance R which is connected in series with the primary terminal 311 of the distributor D. Terminals 300 and 306 are connected by a conductor 312 with line 288. With switch 298 closed and the switch 262 in kickdown position ground 294 will be brought to the primary coil of the distributor D through terminal 311. Relay terminal 297 is connected by a conductor 314 with one end of the solenoid 234 which has a movable core or plunger 236 previously referred to which is adapted to engage brake shoe 230 as shown in Fig. 4. The other end of the winding 316 is connected by conductor 322 to the source of current 259.

A conventional short circuited coil 317 is used to delay opening of switches 296 and 298 upon deenergization of the coil 251. The kickdown switch 262 is operated by a lever 323 through a link 324 connected with the accelerator pedal 326 normally held in its up or released position by a spring 328. The lever 323 has a forked end 330 which receives between its prongs the operating finger 332 of the switch 262. The lever 323 also connects by a lost motion linkage 334 with the throttle operating valve lever 336. Thus depression of the accelerator pedal to an extreme position will initiate interruption of engine ignition and energization of solenoid 234 to effect a "kickdown."

The solenoid 234 will be energized to effect a withdrawal of pawls 170 when the governor 274 slows down sufficiently to close switch 282 while the vehicle is being operated with lever 323 in the position illustrated in Fig. 12. Switch 250 is closed at that time due to the delayed opening thereof. It having been previously energized through the high speed side of the governor by energization of coil 251 by current flowing from battery 259 through the closed ignition switch 257, through coil 251 to terminal 260 of switch 262, through line 268 to ground through terminals 270 and 276. When governor 274 slows down and opens contacts 270 and 276 and closes switch 282 the opening of switch 260 is delayed. Therefore a circuit exists to solenoid 234 from battery 259, through line 322, switch 296 to line 288 and through switch 282 to ground. The distributor is simultaneously grounded through switches 308 and 282. In addition, the solenoid 234 is energized when bar 266 is moved to its dotted position for kickdown above governor speed. In this instance, contacts 270 and 276 are made so that coil 251 is energized and switch 250 closed. The current then flows from battery 259 through solenoid 234, switch 296 and line 288 to ground 294. Simultaneously the distributor D is grounded through switch 308 and ground 294. Reference may be had to the copending application of Louis B. Forman, Serial No. 789,159 for a more detailed description of the electrical circuit.

Figure 6:
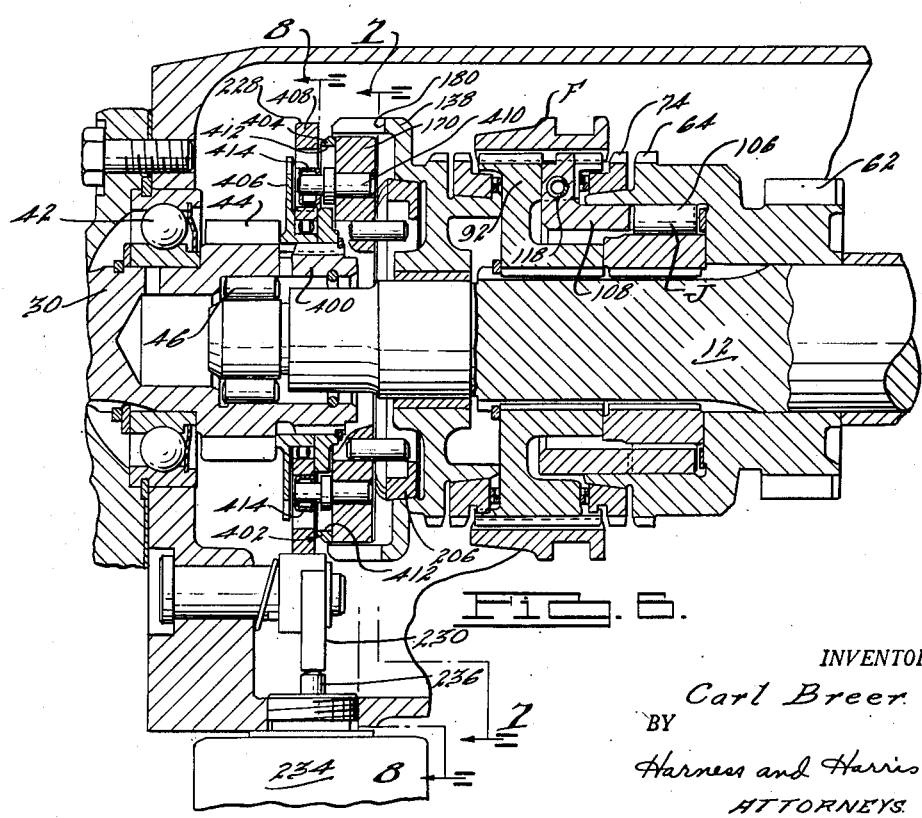
Fig. 6 is a detailed enlarged view of a second-direct clutch mechanism similar to Fig. 3, but incorporating a modified form of the invention.

Figures 6, 7 and 8 illustrate a modified form of the invention. In this form of the invention the same or a similar transmission is used, but a different mechanism for retracting the pawls in response to energization of solenoid 234 is substituted therein. The drive pinion 44 is provided with a splined hub 400 and the shell 138 and balk ring 206 are similar to that illustrated in Fig. 3. A pawl carrier 402 is formed by an inner element 404 and an outer element 406 which are both splined on hub 400. An actuator plate 408 is rotatably mounted on element 406. A pair of pawls 170 are carried by a pawl carrier element 404 which is provided with guides 172 and 174 and springs 194 which engage wing portions 200 of the pawls 170 to urge the pawls inwardly. The actuator plate 408 is provided with a friction surface 228 adapted to cooperate with brake shoe 230 which is pivotally mounted at 232 and actuated by plunger 236 of solenoid 234. Each pawl 170 is provided with a pin 410 which is secured thereto. The pawl carrier 402 is provided with a pair of elongated slots 412 through which pins 410 project. The outer end of each pin 410 carries a roller 414. The actuator plate 408 is provided with a pair of cam slots 416 having cam surfaces 418 formed therein. Each roller 414 is positioned in one of the cam slots 416. A pair of compression springs 420 (Fig. 8) are secured to the pawl carrier 402 and react against the actuator plate 408.

In the operation of this modified apparatus when the solenoid 234 is energized by a control circuit such as that illustrated in Fig. 12 the brake 230 is applied to surface 228 of actuator plate 408. At this time the pawls are in engagement with windows 180 of shell 138 and the rollers 414 are in engagement with surface 418 of slots 416 in the actuator plate. The application of a braking force to the actuator plate 408 causes this plate to slow down and rotate relative to the pawl carrier 402. Since the rollers 414 are carried by pawls 170 which rotate with the pawl carrier 402 the slots 416 rotate relative to the rollers and the cam surface 418 gradually moves the rollers 414 and pawls 170 radially inward to disengage the pawls from shell 138. If desired the contour of the surfaces 418 may be so chosen that they will apply forces to retract the pawls which are proportional to the opposing centrifugal forces. This is desirable because the further out that the pawls are the greater are the centrifugal forces to be overcome. The elongated slots 412 in the pawl carrier 402 permit this radial movement of pins 410. Since the actuator plate 408 moves relative to the pawl carrier 402 in effecting this pawl disengagement the springs 420 are compressed. After the pawls are withdrawn from shell 138 and brake shoe 230 released the springs 420 return the actuator plate to its original position relative to the pawl carrier so that rollers 414 again engage the initial portion of slots 416. This retracted initial position of rollers 414 is illustrated in Fig. 8 and the slots 416 accommodate the next outward movement of the pawls 170 under the influence of centrifugal force. This form of the invention reduces the torque necessary to disengage the pawls.

Figure 11:
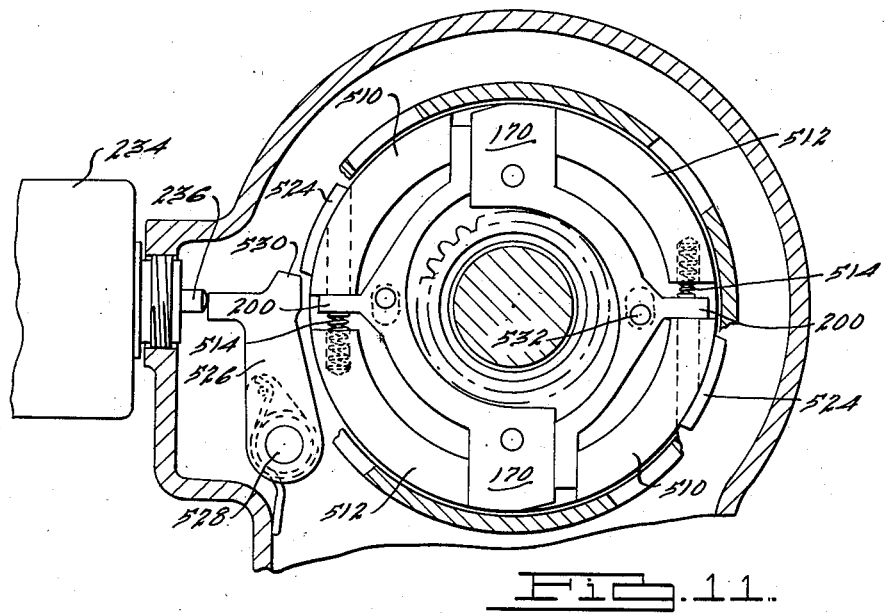
Fig. 11 is a section taken on the line 11—11 of Figure 9.

In Figures 9, 10 and 11 a further modified form of the invention has been substituted in the transmission. In this form of the invention the same or a similar transmission is used as in the principal form, but a different mechanism for retracting the pawls in response to energization of solenoid 234 is substituted therein. The drive pinion 44 is provided with a splined hub 500 and the shell 138 and balk ring 206 are similar to that illustrated in Fig. 3. A pawl carrier 502 is keyed to hub 500. An actuator assembly 503 comprising a plate 504 and a backing plate 506 which are secured together as by rivets 508 is rotatably carried by hub 500. A pair of pawls 170 are carried by pawl carrier 502 which is provided with guides 510 and 512 and springs 514 which engage wing portions 200 of the pawls 170 to urge the pawls inwardly. The actuator assembly 503 is provided with a circumferential space 516 in which a floating plate 518 is squeezed between a pair of friction mats 520 and 522 in space 516. Mats 520 and 522 engage backing plate 506 and plate 504 with a predetermined force established by the rivet 508. This floating plate is provided with a plurality of lugs 524 on its periphery. A lever 526 is pivoted at 528 and actuated by plunger 236 of solenoid 234. This lever 526 corresponds to brake shoe 238 but instead of having a friction surface it has an abutment surface 530 at the end thereof. A spring 532 urges lever 526 in a counterclockwise direction in Fig. 11. Under normal driving conditions the actuator assembly rotates as a unit but when solenoid 234 moves lever 526 in a clockwise direction the abutment surface 530 interferes with the rotation of a lug 524 and stops rotation of floating plate 518. This applies a friction load to plates 506 and 504 through mats 520 and 522. Each pawl 170 is provided with a pin 532 secured thereto. The pawl carrier 502 and actuator assembly plate 504 are each provided with elongated slots 534 to receive pins 532. When plate 504 is slowed down by friction as described above the ends of the slots 534 in plate 504 engage pins 532 to retract the pawls. A pair of springs 536 are positioned in slots 538 provided in the actuator plate 504 and secured to the pawl carrier 502 by pin 503. The springs 536 serve to return the actuator assembly 503 to its initial position relative to the pawl carrier. Slots 534 in the actuator plate 504 accommodate this movement. Slots 534 in both the pawl carrier and actuator assembly accommodate outward movement of the pawls 170 and pins 532 under the influence of centrifugal force.

It is to be understood that although mechanical means have been illustrated herein for the application of a retarding force to the actuator plate it is also possible to achieve this result by other means such as a clutch of the eddy current type.

Although the particular structure shown and described above is well adapted for carrying out the various objects of my invention, it will be understood that various modifications, changes and substitutions may be made without departing from the spirit thereof. The subject invention is, therefore, to be construed to include all such modifications, changes, and substitutions as may come within the scope of the following claims.

I claim:

1. In a variable speed power transmission, a drive shaft, a driven shaft, a centrifugal clutch for drivingly connecting said shafts to drive the driven shaft at the speed of the drive shaft, said clutch comprising a shell carried by one of said shafts, a pawl carrier member mounted for rotation with the other of said shafts, a pawl mounted on said carrier for radial movement relative thereto under the influence of centrifugal force to engage said shell and mounted for rotation with said pawl carrier member, means including a one-way coupling device for driving the driven shaft at a slower speed than the drive shaft when said centrifugal means is disengaged and a pawl retracting device for forcibly releasing said pawl from said shell comprising a friction brake mechanism operable to impart relative rotation between said pawl and said pawl carrier member.

2. In a variable speed power transmission, a drive shaft, a driven shaft, a pawl carrier member carried by said drive shaft, a second member carried by said pawl carrier member for limited rotation relative thereto, a pawl carried by said carrier member for rotation therewith and radial movement under the influence of centrifugal force, means operatively connecting said second member and said pawl, an annular shell, said shell having an opening adapted to receive said pawl when the latter is acted upon by centrifugal force upon rotation of said drive shaft, means to transmit drive from said shell to said driven shaft and a brake mechanism selectively operable on said second member to retard the rotation of said second member and said pawl relative to said pawl carrier member to effect withdrawal of said pawl from said shell.

3. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate carried by said pawl carrier plate and having an operative connection with said pawl and friction brake mechanism selectively engageable with said actuator plate to decelerate said actuator plate relative to said carrier plate and thereby overcome the centrifugal force acting on said pawl to forcibly retract said pawl from said shell and effect a drive of said driven shaft by said second means.

4. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, a pin connected to said pawl, said pawl carrier plate being provided with an opening adapted to accommodate relative circumferential movement between said pin and said pawl carrier plate and means adapted to decelerate said pin relative to said pawl carrier plate and thereby overcome the centrifugal force acting on said pawl to forcibly retract said pawl from said shell and effect a drive of said driven shaft by said second means.

5. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, a pin connected to said pawl, said pawl carrier plate being provided with an opening adapted to accommodate relative circumferential movement between said pin and said pawl carrier plate, an actuator plate carried by said pawl carrier plate and operatively associated with said pin, and means to decelerate said actuator plate relative to said carrier plate and thereby overcome the centrifugal force acting on said pawl to forcibly retract said pawl from said shell and effect a drive of said driven shaft by said second means.

6. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate carried by said pawl carrier plate and having an operative connection with said pawl, a movable member, a solenoid adapted to move said member into engagement with said actuator plate to decelerate the latter relative to said carrier plate and thereby overcome the centrifugal force acting on said pawl to forcibly retract said pawl from said shell and effect a drive of said driven shaft by said second means and means to energize and deenergize said solenoid.

7. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate carried by said pawl carrier plate and having an operative connection with said pawl, said actuator plate being provided with a braking surface on its peripheral edge, and brake means adapted to be applied to said surface to decelerate said actuator plate relative to said carrier plate and thereby overcome the centrifugal force acting on said pawl to forcibly retract said pawl from said shell and effect a drive of said driven shaft by said second means.

8. In a variable speed power transmission, a housing, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate carried by said pawl carrier plate and having an operative connection with said pawl, said actuator plate being provided with a braking surface on its peripheral edge, a brake shoe pivotally mounted on said housing, cooperating spring and solenoid means to selectively engage said shoe with said surface to decelerate said actuator plate relative to said carrier plate and thereby overcome the centrifugal force acting on said pawl to forcibly retract said pawl from said shell and effect a drive of said driven shaft by said second means and means to selectively energize and deenergize said solenoid.

9. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and connected therewith for limited rotation relative thereto, a pin connecting said actuator plate with said pawl, said pawl carrier plate having a slot therein associated with said pin to accommodate rotation of said pin and actuator plate relative to said pawl carrier plate, and means to decelerate said actuator plate relative to said carrier plate and thereby overcome the centrifugal force acting on said pawl to forcibly retract said pawl from said shell and effect a drive of said driven shaft by said second means.

10. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and connected therewith for limited rotation relative thereto, a pin connecting said actuator plate with said pawl, said pawl carrier plate having a slot therein associated with said pin to accommodate rotation of said pin and actuator plate relative to said pawl carrier plate, a movable member, a solenoid adapted to move said member into engagement with said actuator plate to decelerate the latter relative to said carrier plate and thereby overcome centrifugal force acting on said pawl to forcibly retract said pawl from said shell and effect a drive of said driven shaft by said second means and means to selectively energize and denergize said solenoid.

11. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and connected therewith for limited rotation relative thereto, a pin connecting said actuator plate with said pawl, said pawl carrier plate having a slot therein associated with said pin to accommodate rotation of said pin and actuator plate relative to said pawl carrier plate, said actuator plate being provided with a braking surface on its peripheral edge, and brake means adapted to be applied to said surface to decelerate said actuator plate relative to said carrier plate and thereby overcome the centrifugal force acting on said pawl to forcibly retract said pawl from said shell and effect a drive of said driven shaft by said second means.

12. In a variable speed power transmission, a housing, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and connected therewith for limited rotation relative thereto, a pin connecting said actuator plate with said pawl, said pawl carrier plate having a slot therein associated with said pin to accommodate rotation of said pin and actuator plate relative to said pawl carrier plate, said actuator plate being provided with a braking surface on its peripheral edge, a brake shoe pivotally mounted on said housing, cooperating spring and solenoid means to selectively engage said shoe with said surface to decelerate said actuator plate relative to said carrier plate and thereby overcome the centrifugal force acting on said pawl to forcibly retract said pawl from said shell and effect a drive of said driven shaft by said second means and means to selectively energize and deenergize said solenoid.

13. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate and having a surface adapted to engage said cam surface when said pawl is extended, and means to decelerate said actuator plate relative to said carrier plate and thereby cam said pin and said pawl inwardly to forcibly retract said pawl from said shell to effect a drive of said driven shaft by said second means.

14. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate, and having a surface adapted to engage said cam surface when said pawl is extended, a movable member, a solenoid adapted to move said member into engagement with said actuator plate to decelerate the latter relative to said carrier plate and thereby cam said pin and said pawl inwardly to forcibly retract said pawl from said shell to effect a drive of said driven shaft by said second means and means to selectively energize and deenergize said solenoid.

15. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate, and having a surface adapted to engage said cam surface when said pawl is extended, said actuator plate being provided with a braking surface on its peripheral edge, and brake means adapted to be applied to said surface to decelerate said actuator plate relative to said carrier plate and thereby cam said pin and said pawl inwardly to forcibly retract said pawl from said shell to effect a drive of said driven shaft by said second means.

16. In a variable speed power transmission, a housing, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate, and having a surface adapted to engage said cam surface when said pawl is extended, said actuator plate being provided with a braking surface on its peripheral edge, a brake shoe pivotally mounted on said housing, cooperating spring and solenoid means to selectively engage said shoe with said surface to decelerate said actuator plate relative to said carrier plate and thereby cam said pin and said pawl inwardly to forcibly retract said pawl from said shell to effect a drive of said driven shaft by said second means and means to selectively energize and deenergize said solenoid.

17. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate, a roller carried by said pin and adapted to engage said cam surface when said pawl is extended, means to decelerate said actuator plate relative to said carrier plate and thereby cam said pin and said pawl inwardly to forcibly retract said pawl from said shell to effect a drive of said driven shaft by said one-way coupling device and spring means acting between said actuator plate and said carrier plate to impart relative rotation thereto to return said plates to their relative positions assumed prior to deceleration of said actuator plate.

18. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto, a shell adapted to be engaged by said pawl and drivingly connected to said driven shaft, an actuator plate located adjacent said pawl carrier plate and having an elongated slot therein with one edge thereof defining a cam surface, a pin projecting from said pawl, said pawl carrier plate having an opening therein associated with said pin to accommodate radial movement of said pin relative to said pawl carrier plate, said pin being adapted to penetrate said elongated slot in said actuator plate, a roller carried by said pin and adapted to engage said cam surface when said pawl is extended, said actuator plate being provided with a braking surface on its peripheral edge, and brake means adapted to be applied to said surface to decelerate said actuator plate relative to said carrier plate and thereby cam said pin and said pawl inwardly to forcibly retract said pawl from said shell to effect a drive of said driven shaft by said one-way coupling device and spring means acting between said actuator plate and said carrier plate to impart relative rotation thereto to return said plates to their relative positions assumed prior to deceleration of said actuator plate.

19. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and comprising first and second elements having a frictional slip connection therebetween which will accommodate frictionally resisted relative rotation, said first element of said actuator plate being connected to said pawl carrier plate for limited rotation relative thereto, a pin connecting said first element of said actuator plate with said pawl, said pawl carrier plate having a slot therein associated with said pin to accommodate rotation of said pin and first element relative to said pawl carrier plate and means to obstruct the rotation of said second element of said actuator plate and thereby decelerate said first element of said actuator plate relative to said carrier plate to overcome the centrifugal force acting on said pawl to forcibly retract said pawl from said shell and effect a drive of said driven shaft by said second means.

20. In a variable speed power transmission, a drive shaft, a driven shaft, change speed mechanism for drivingly connecting said shafts, said mechanism comprising a centrifugally engageable clutch means for driving the driven shaft at the speed of the drive shaft, a second means for driving the driven shaft at a slower speed than the drive shaft when said centrifugal clutch means is disengaged, said centrifugally engageable clutch means comprising a pawl carrier plate keyed to said drive shaft, a pawl carried by said plate for rotation therewith and radial movement relative thereto under the influence of centrifugal force, a shell adapted to be engaged by said pawl and drivingly connected to said driven shaft, an actuator plate located adjacent said pawl carrier plate and comprising first and second elements having a frictional slip connection therebetween which will accomodate frictionally resisted relative rotation, said first element of said actuator plate being connected to said pawl carrier plate for limited rotation relative thereto, a pin connecting said first element of said actuator plate with said pawl, said pawl carrier plate having a slot therein associated with said pin to accommodate rotation of said pin and first element relative to said pawl carrier plate, said second element of said actuator plate being provided with an abutment thereon, a movable member, a solenoid adapted to move said member into position to engage said abutment to stop rotation of said second element and thereby decelerate rotation of said first element relative to said carrier plate to overcome the centrifugal force acting on said pawl to forcibly retract said pawl from said shell and effect a drive of said driven shaft by said second means and means to energize and deenergize said solenoid.

21. A centrifugal clutch comprising a driving element, a driven element, a pawl carrier plate drivingly connected to said driving element, a pawl carried by said plate for rotation therewith and radial movement relative thereto under the influence of centrifugal force, a shell adapted to be engaged by said pawl and drivingly connected to said driven element, an actuator plate carried by said pawl carrier plate for limited rotation relative thereto, said actuator plate having an operative connection with said pawl and a brake mechanism selectively operable on said actuator plate to effect rotation of said actuator plate relative to said carrier plate to overcome the centrifugal force acting on said pawl and forcibly retract said pawl from said shell.

22. A centrifugal clutch comprising a driving element, a driven element, a pawl carrier plate drivingly connected to said driving element, a pawl carried by said plate for rotation therewith and radial movement relative thereto, a shell adapted to be engaged by said pawl and drivingly connected to said driven element, a pin connected to said pawl, said pawl carrier plate being provided with a circumferentially elongated slot adapted to accommodate relative circumferential movement between said pin and said pawl carrier plate, an actuator plate carried by said pawl carrier plate and operatively associated with said pin, and means to decelerate said actuator plate relative to said carrier plate and thereby overcome centrifugal force and forcibly retract said pawl from said shell.

23. A centrifugal clutch comprising a driving element, a driven element, a pawl carrier plate drivingly connected to said driving element, a pawl carried by said plate for rotation therewith and radial movement relative thereto under the influence of centrifugal force, a shell adapted to be engaged by said pawl and drivingly connected to said driven element, an actuator plate mounted on said pawl carrier plate for limited rotation relative to said carrier plate and having an elongated slot therein with one edge thereof defining a cam surface, a pin projecting from said pawl into said elongated slot in said actuator plate and having a surface adapted to engage said cam surface when said pawl is extended, and a brake mechanism selectively operable on said actuator plate to effect rotation of said actuator plate relative to said carrier plate and thereby cam said pin and said pawl inwardly to forcibly retract said pawl from said shell.

CARL BREER.

REFERENCES CITED

The following references are of record in the file of this patent:

UNITED STATES PATENTS

| Number | Name | Date |
|---|---|---|
| 2,056,365 | Rauen | Oct. 6, 1936 |
| 2,160,817 | Barnes | June 6, 1939 |
| 2,312,889 | Weverts | Mar. 2, 1943 |
| 2,343,312 | Maurer | Mar. 7, 1944 |
| 2,355,710 | Dodge | Aug. 15, 1944 |